United States Patent

Sumpter et al.

Patent Number: 5,436,274
Date of Patent: Jul. 25, 1995

[54] PREPARATION OF SILICONE FOAMS OF LOW DENSITY AND SMALL CELL SIZE

[75] Inventors: Chris A. Sumpter; Larry N. Lewis, both of Scotia, N.Y.

[73] Assignee: General Electric Company, Schenectady, N.Y.

[21] Appl. No.: 315,806

[22] Filed: Sep. 30, 1994

[51] Int. Cl.$^6$ ................................................ C08J 9/02
[52] U.S. Cl. ...................................... 521/88; 521/117; 521/154
[58] Field of Search ............................ 521/88, 117, 154

[56] References Cited

U.S. PATENT DOCUMENTS

| | | |
|---|---|---|
| 4,026,843 | 5/1977 | Kittle ................................. 521/154 |
| 4,026,844 | 5/1977 | Kittle et al. . |
| 4,418,157 | 11/1983 | Modic . |
| 4,590,222 | 5/1986 | Bauman ............................. 521/154 |
| 4,871,781 | 10/1989 | Weise ................................. 521/154 |

*Primary Examiner*—Morton Foelak
*Attorney, Agent, or Firm*—William H. Pittman

[57] ABSTRACT

Silicone foams having low density and small cell size are prepared by blending a mixture of at least one polyorganosiloxane having vinyl groups attached to silicon, at least one hydride polysiloxane, a mixture of at least one monohydroxyaliphatic compound and at least one dihydroxyaliphatic compound each of which contains at least 5 carbon atoms in an equivalent ratio in the range of about 1.5–4.0:1, water, a platinum group catalyst and a filler. Said mixture comprises at least about 5% of the combination of silica and silicon-containing compounds having a high proportion of Q units.

21 Claims, No Drawings

PREPARATION OF SILICONE FOAMS OF LOW DENSITY AND SMALL CELL SIZE

BACKGROUND OF THE INVENTION

This invention relates to the preparation of silicone foams, and more particularly to a method for their preparation which is characterized by improved safety and product quality.

As used herein, the term "silicone foam" designates a polyorganosiloxane composition in the form of a foam. Silicone foams are well known in the art and their preparation is described in a number of patents. A method of high current interest involves contact between a polyorganosiloxane having vinyl groups attached to silicon, a polysiloxane having hydrogen atoms attached to silicon and a hydroxy compound. Upon contact with a platinum group catalyst, two reactions occur: hydrosilylation of the vinyl groups by interaction with the silicon-hydrogen moieties, and generation of hydrogen by interaction of the hydroxy compound with the silicon-hydrogen moieties. The hydrogen thus generated acts as a blowing agent to produce the foam.

Numerous types of hydroxy compounds have been employed in this method of preparing foam. They include water and silanols (i.e., compounds containing at least one Si—OH group), which, however, tend to afford foams having densities too high for many applications.

Also employed, as disclosed, for example, in U.S. Pat. No. 4,026,843, are low molecular weight alkanols such as methanol and ethanol. Methanol, in particular, is known to produce a low density foam with small cells. However, its very low vapor pressure and low boiling point dictate that it be added just prior to foaming, rather than incorporated in a package with a useful shelf life. In addition, its low flash point (11° C.) causes safety concerns.

The replacement of low molecular weight alkanols with higher molecular weight materials has been suggested. For example, U.S. Pat. No. 4,590,222 discloses the use of alkanols and alkanediols having 3–12 carbon atoms, with lauryl alcohol being singled out. The use of diols of various carbon chain lengths is also disclosed in U.S. Pat. No. 4,871,781.

Experimentation has shown that alkanols having 3 or 4 carbon atoms also afford low density foams; however, they are only marginally superior to methanol and ethanol in vapor pressure and safety aspects. The use of higher molecular weight alkanols produces foamed materials having very large cells, typically with a diameter greater than 1 mm., rather than the desired foams of small cell size. Polyols, including diols such as 1,6-hexanediol, produce foams with small cell size but relatively high density, typically greater than 0.22 g/cm$^3$.

Thus, it remains of interest to produce silicone foams having small mean cell size, typically up to 0.5 mm., and low density, typically up to 0.21 g/cm$^3$. The present invention provides a method for preparing such foams and compositions useful in said method.

SUMMARY OF INVENTION

One aspect of the invention is a method for preparing a silicone foam which comprises blending a mixture comprising:

(A) at least one polyorganosiloxane wherein about 0.0002–3.0% by weight of the organo groups bonded to silicon are vinyl groups;

(B) 0.5–50 parts, per 100 parts of reagent A, of at least one hydride polysiloxane comprising diorganosiloxane units in combination with organosiloxane units having one Si—H moiety and containing about 0.2–2.0% by weight hydrogen as Si—H groups;

(C) about 40–80 mmol per 100 parts of said mixture, based on hydroxy groups, of a blend of at least one monohydroxyaliphatic compound and at least one dihydroxyaliphatic compound each containing at least 5 carbon atoms, the ratio of equivalents of said dihydroxyaliphatic to said monohydroxyaliphatic compound being about 1.5–4.0:1;

(D) about 15–20 parts, per 100 parts of reagent A, of water;

(E) at least one platinum group catalyst in an amount effective to cause hydrosilylation of reagent A with reagent B and generation of hydrogen as a blowing agent; and (F) at least about 2%, based on said mixture, of at least one filler;

said mixture comprising at least about 5% of the combination of silica and silicon-containing compounds having a number ratio of M and D units combined to Q units of at most 2.0:1;

all parts and percentages being by weight unless otherwise indicated.

Another aspect is compositions convertible to silicone foams, comprising reagents A—F as described hereinabove.

DETAILED DESCRIPTION; PREFERRED EMBODIMENTS

Reagent A according to the present invention is at least one polyorganosiloxane having vinyl groups bonded to silicon. Such silicone materials are well known in the art and have been employed previously in the preparation of cured silicone materials, including foams. They are described, for example, in U.S. Pat. Nos. 4,418,157, 4,851,452 and 5,011,865, the disclosures of which are incorporated by reference herein.

A typical linear (polydiorganosiloxane) silicone material useful as reagent A is represented by the formula

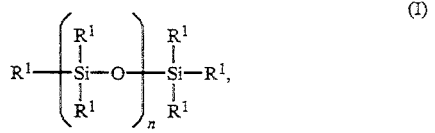

wherein each $R^1$ is independently $C_{1-6}$ alkyl, phenyl, 3,3,3-trifluoropropyl or vinyl and n has a value such that the viscosity of the silicone is in the range of about 100–1,000,000, preferably about 1,000–250,000 and most preferably about 2,500–100,000 centipoise at 25° C. Most often, each $R^1$ that is not vinyl is methyl.

An art-recognized convention for designating silicone structural units in accordance with the number of oxygen atoms attached to silicon is employed herein. That convention uses the letters M, D, T and Q to designate said number of oxygen atoms as abbreviations for "mono", "di", "tri" and "quatro". Thus, the silicone of formula I consists of M end groups and D internal units. The presence of T and/or Q units imparts branched and/or crosslinked structure to the compound. As further used herein, expressions such as "M(vinyl)" and "D(hydrogen)" denote an appropriate unit respectively having one vinyl group or one hydrogen atom attached to silicon.

The proportion of M, D, T and Q units in reagent A and in the mixture as a whole may be varied to afford a composition of the desired degree of branching and other properties. Thus, for example, the aforementioned U.S. Pat. No. 4,418,157 describes a base silicone material which may contain vinyl groups bonded to silicon and which has prescribed proportions of M, D and Q units.

For the purposes of the present invention, it is preferred that at least about 20% by weight of reagent A comprise compounds with a high proportion of Q units. More specifically, the ratio of combined M and D units to Q units in such compounds is at most 2:1 and preferably about 1.5–2.0:1. Compounds having these proportions are highly crosslinked and/or three-dimensional in structure, and have the nature of silica-like molecular species which are organophilic. Such compounds may be prepared by art-recognized methods, such as the reaction of a silica hydrosol with an alkyl silicate or alkylchlorosilane containing one or more alkyl groups per molecule.

In general, reagent A comprises principally compounds in which vinyl groups are bonded to terminal silicon atoms on the silicone chain. The proportion of vinyl groups therein is in the range of 0.0002–3.0% and preferably 0.0002–0.1% by weight.

Reagent B may be represented by a linear polysiloxane of the formula

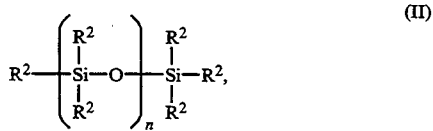

(II)

wherein each $R^2$ is independently $C_{1-6}$ alkyl, phenyl, 3,3,3-trifluoropropyl or hydrogen, the hydrogen comprising about 0.3–2.0% by weight thereof. Most often, reagent B has an average of at least about three Si—H moieties per molecule and an average of no more than one hydrogen atom bonded to any silicon atom, and any non-hydrogen $R^2$ values are methyl.

Reagent C is a mixture of at least one monohydroxyaliphatic compound (hereinafter sometimes "alkanol") and at least one dihydroxyaliphatic compound (hereinafter sometimes "diol"). Both the alkanol and the diol contain at least 5 and preferably 5–10 carbon atoms.

Reagent D is water, whose presence as part of the blowing agent is mandatory according to the invention.

Reagent E is at least one platinum group catalyst. By "platinum group" is meant the portion of Group VIII of the Periodic Table, as traditionally identified, containing the metals rhodium, ruthenium, palladium, osmium, iridium and platinum. The preferred metals from this group are rhodium, palladium and platinum, with platinum being particularly preferred because of its relative availability and particular suitability.

Numerous types of platinum catalysts are known in the art and are disclosed in the patents incorporated by reference hereinabove. They include, for example, reaction products of chloroplatinic acid with olefins, alcohols, ethers, aldehydes and vinylsiloxanes such as tetramethyldivinyldisiloxane. A reaction product of chloroplatinic acid with tetramethyldivinyldisiloxane in the presence of sodium bicarbonate as disclosed in U.S. Pat. No. 3,775,452, dissolved in xylene to a level of about 5% by weight platinum, is preferred; it is hereinafter designated "Karstedt's catalyst".

Reagent F is at least one filler. Suitable fillers include reinforcing fillers such as fumed silica and precipitated silica and extending fillers such as ground quartz, titanium dioxide, zinc oxide, zirconium silicate, silica aerogel, iron oxide, diatomaceous earth, calcium carbonate, magnesium oxide, calcined clay and carbon (e.g., graphite or carbon black).

As previously mentioned, the use of silanols as sources for the hydrogen used as a blowing agent for the silicone foam is a feature of many previously known foam preparation methods. For the purposes of the present invention, however, it is strongly preferred that the foam-producing composition be free from silanols, by reason of their tendency to increase the density of the foam.

The proportions of reagents B and D are about 0.5–50 and about 15–20 parts, respectively, per 100 parts of reagent A. The preferred proportion for reagent B is about 10–20 parts. About 5–20 and preferably about 10–15 milliequivalents (based on the same parts by weight) of reagent C are present per 100 parts of reagent A.

The ratio of equivalents of diol to alkanol in reagent C is critical and is in the range of about 1.5–4.0:1, preferably 1.8–3.5:1. At weight ratios lower than 1.5:1, silicone foams having a density above 0.22 g/cm³ or having a mean cell size greater than 0.6 mm. are typically produced. For the purposes of the invention, the equivalent weights of an alkanol and a diol are respectively its molecular weight and half its molecular weight.

Any amount of catalyst (reagent E) effective to catalyze hydrosilylation of reagent A with reagent B and formation of hydrogen as a blowing agent may be employed. Typically, an amount to provide about 10–140 and preferably about 25–75 parts of platinum per million parts of mixture is employed.

The proportion of filler (reagent F) in the mixture is at least about 2% and preferably about 20–30%.

The present invention requires the presence in the foam-producing mixture of at least about 5% of the combination of silica and silicon-containing compounds having a number ratio of M and D units combined to Q units of at most 2:1, preferably about 1.5–2.0:1. Compounds within this combined class include silica employed as filler (reagent F) and the aforementioned constituents of reagent A containing high proportions of Q units. They preferably comprise about 5–10% of the mixture. They are required in the recited proportions to provide sufficient body in the foam after blowing.

The presence of other materials in the foam-forming composition is also contemplated. These may include flame retardation enhancing additives and catalyst inhibitors, the latter being illustrated by cyclic vinylsiloxanes and acetylenic alcohols.

Also present may be additives to reduce silicone foam density. These may include triarylphosphines or their complexes with platinum (the latter employed as part of the catalyst), cyclic hydride polysiloxanes and aqueous buffer solutions having a pH in the range of about 2–10, with about 9–10 often being preferred. The buffer solution may also be the source of the water (reagent D) employed.

To produce a silicone foam according to the method of the invention, the above-described reagents and components are blended in any desired order. It is often preferred to prepare an initial mixture comprising a major proportion of reagent A, water and filler, and to subsequently add catalyst followed by a mixture of reagents B, C and a minor proportion of reagent A. Upon incorporation of the mixture including reagents B and C, foam production is initiated and is usually complete within a few minutes.

The invention is illustrated by the following examples. Parts are by weight unless otherwise indicated. All organic groups bonded to silicon are methyl unless otherwise indicated.

EXAMPLES 1-2

The following materials were blended in a dual planetary mixer:

$M_{1.4}D(vinyl)_{0.25}Q$ resin–18.25 parts;

$M(vinyl)D_xM(vinyl)$ fluid having a viscosity of 4000 centipoise–15 parts;

$M(vinyl)D_xM(vinyl)$ fluid having a viscosity of 80,000 centipoise–39.75 parts;

Aqueous buffer solution containing 0.25% sodium carbonate and 0.209% sodium bicarbonate–1.5 parts;

α-Quartz filler–25 parts.

To 20 parts of the viscous mixture thus obtained, in a 100-ml. plastic cup, was added Karstedt's catalyst in the amount of 40 ppm. of platinum based on the final mixture, and the mixture was stirred by hand for 2 minutes. There was then added a homogeneous mixture of 0.67 part of a $M(vinyl)D_xM(vinyl)$ fluid having a viscosity of 80,000 centipoise, 1.33 parts of a $MD(hydrogen)_xM$ fluid in which x was about 20 and the silicon-bonded hydrogen content was about 1.6%, and homogeneous blends of 1-hexanol and 1,6-hexanediol in various proportions to provide a hydroxy content of 56.8 milliequivalents per 100 parts of mixture. Hand mixing was continued for 30 seconds, whereupon foam formation began and continued for about 3 minutes. After 5 minutes, the foams were tack-free and were analyzed for density. Cell size and number of cells per 10 mm$^2$ were determined by light microscopy of photographed sections.

The results are given in the following table, in comparison to five controls employing other alcohols, diol or alkanol individually or diol-alkanol mixtures outside the scope of the invention.

|  | Alcohol | | Mean | |
| --- | --- | --- | --- | --- |
|  | Identity | Eq. ratio | Density, g/cm$^3$ | Cell size, mm. | Cells per 10 mm$^2$ |
| Example |  |  |  |  |  |
| 1 | Hexanediol/hexanol | 3:1 | 0.207 | 0.46 | 570 |
| 2 | Hexanediol/hexanol | 1.86:1 | 0.199 | 0.436 | 533 |
| Control 1 | Methanol | — | 0.175 | 0.413 | 518 |
| Control 2 | Hexanediol | — | 0.227 | 0.193 | 1304 |
| Control 3 | Hexanol | — | 0.318 | * | * |
| Control 4 | Hexanediol/hexanol | 1:1 | 0.228 | 0.591 | 388 |
| Control 5 | Hexanediol/hexanol | 0.33:1 | 0.203 | 1.46 | 63 |

*Very large (2-3 mm. diameter or greater) cells.

It is apparent from the table that the foams of Examples 1 and 2, within the present invention, were essentially equivalent in density and cell size to those of Control 1 in which the alcohol employed was methanol. When 1,6-hexanediol was the only alcohol employed (Control 2), the resulting foam had an undesirably high density. This was also the case when a 1:1 equivalent ratio of diol and alkanol was employed (Control 4). 1-Hexanol alone (Control 3) produced a very dense foam with very large cells, and a diol-alkanol mixture in an equivalent ratio of 0.33:1 (Control 5) afforded a foam with low density but undesirably large cell size.

What is claimed is:

1. A method for preparing a silicone foam which comprises blending a mixture comprising:
   (A) at least one polyorganosiloxane wherein about 0.0002–3.0% by weight of the organo groups bonded to silicon are vinyl groups;
   (B) 0.5–50 parts, per 100 parts of reagent A, of at least one hydride polysiloxane comprising diorganosiloxane units in combination with organosiloxane units having one Si—H moiety and containing about 0.2–2.0% by weight hydrogen as Si—H groups;
   (C) about 40–80 mmol per 100 parts of said mixture, based on hydroxy groups, of a blend of at least one monohydroxyaliphatic compound and at least one dihydroxyaliphatic compound each containing at least 5 carbon atoms, the ratio of equivalents of said dihydroxyaliphatic to said monohydroxyaliphatic compound being about 1.5–4.0:1;
   (D) about 15–20 parts, per 100 parts of reagent A, of water;
   (E) at least one platinum group catalyst in an amount effective to cause hydrosilylation of reagent A with reagent B and generation of hydrogen as a blowing agent; and
   (F) at least about 2%, based on said mixture, of at least one filler;
   said mixture comprising at least about 5% of the combination of silica and silicon-containing compounds having a number ratio of M and D units combined to Q units of at most 2.0:1;
   all parts being by weight unless otherwise indicated.

2. A method according to claim 1 wherein said mixture is free from silanols.

3. A method according to claim 2 wherein each organo group in reagent A which is not vinyl is methyl and each organo group in reagent B is methyl.

4. A method according to claim 3 wherein reagent A comprises principally compounds in which vinyl groups are bonded to terminal silicon atoms on the silicone chain.

5. A method according to claim 3 wherein the monohydroxyaliphatic compound and dihydroxyaliphatic compound of reagent C each contain 5–10 carbon atoms.

6. A method according to claim 3 wherein the ratio of equivalents of dihydroxyaliphatic to monohydroxyaliphatic compound in reagent C is in the range of about 1.8–3.5:1.

7. A method according to claim 3 wherein the proportion of reagent B is about 10–20 parts.

8. A method according to claim 3 wherein the platinum group metal in reagent E is platinum.

9. A method according to claim 8 wherein reagent E is a reaction product of chloroplatinic acid with tetramethyldivinyldisiloxane.

10. A method according to claim 9 wherein the proportion of platinum is about 25-75 parts per million parts of mixture.

11. A method according to claim 3 wherein said mixture comprises at least about 5% silicon-containing compounds having a number ratio of M and D units combined to Q units of about 1.5-2.0:1.

12. A method according to claim 11 which comprises preparing an initial mixture comprising a major proportion of reagent A, water and filler, and subsequently adding catalyst followed by a mixture of reagents B, C and a minor proportion of reagent A.

13. A composition convertible to a silicone foam, comprising:
   (A) at least one polyorganosiloxane wherein about 0.0002-3.0% by weight of the organo groups bonded to silicon are vinyl groups;
   (B) 0.5-50 parts, per 100 pads of reagent A, of at least one hydride polysiloxane comprising diorganosiloxane units in combination with organosiloxane units having one Si—H moiety and containing about 0.2-2.0% by weight hydrogen as Si—H groups;
   (C) about 40-80 mmol per 100 parts of said mixture, based on hydroxy groups, of a blend of at least one monohydroxyaliphatic compound and at least one dihydroxyaliphatic compound each containing at least 5 carbon atoms, the ratio of equivalents of said dihydroxyaliphatic to said monohydroxyaliphatic compound being about 1.5-4.0:1;
   (D) about 15-20 parts, per 100 parts of reagent A, of water;
   (E) at least one platinum group catalyst in an amount effective to cause hydrosilylation of reagent A with reagent B and generation of hydrogen as a blowing agent; and
   (F) at least about 2%, based on said mixture, of at least one filler;
   said mixture comprising at least about 5% of the combination of silica and silicon-containing compounds having a number ratio of M and D units combined to Q units of at most 2.0:1;
   all parts and percentages being by weight unless otherwise indicated.

14. A composition according to claim 13 which is free from silanols.

15. A composition according to claim 14 wherein each organo group in reagent A which is not vinyl is methyl and each organo group in reagent B is methyl.

16. A composition according to claim 15 wherein reagent A comprises principally compounds in which vinyl groups are bonded to terminal silicon atoms on the silicone chain.

17. A composition according to claim 15 wherein the monohydroxyaliphatic compound and dihydroxyaliphatic compound of reagent C each contain 5-10 carbon atoms and the ratio of equivalents of dihydroxyaliphatic to monohydroxyaliphatic compound therein is in the range of about 1.8-3.5:1.

18. A composition according to claim 15 wherein the proportion of reagent B is about 10-20 parts.

19. A composition according to claim 15 wherein reagent E is a reaction product of chloroplatinic acid with tetramethyldivinyldisiloxane.

20. A composition according to claim 19 wherein the proportion of platinum is about 25-75 parts per million parts of mixture.

21. A composition according to claim 13 wherein said mixture comprises at least about 5% silicon-containing compounds having a number ratio of M and D units combined to Q units of about 1.5-2.0:1.

* * * * *